United States Patent
Lee et al.

(10) Patent No.: US 8,214,848 B2
(45) Date of Patent: Jul. 3, 2012

(54) METHOD AND APPARATUS FOR INSTALLING PRINTER DRIVERS OF IMAGE FORMING APPARATUSES IN PRINTING ENVIRONMENT EMPLOYING UNIVERSAL PRINTER DRIVER

(75) Inventors: Don-seon Lee, Yongin-si (KR); Soung-jin Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 915 days.

(21) Appl. No.: 12/142,101

(22) Filed: Jun. 19, 2008

(65) Prior Publication Data

US 2009/0031330 A1 Jan. 29, 2009

(30) Foreign Application Priority Data

Jul. 23, 2007 (KR) .................. 10-2007-0073504

(51) Int. Cl.
*G06F 3/00* (2006.01)
(52) U.S. Cl. ...................................... 719/321
(58) Field of Classification Search ............ 719/327, 719/321
See application file for complete search history.

(56) References Cited

U.S. PATENT DOCUMENTS

| 6,705,527 | B1 * | 3/2004 | Kelly et al. | 235/472.01 |
| 6,757,070 | B1 * | 6/2004 | Lin et al. | 358/1.1 |
| 6,825,941 | B1 * | 11/2004 | Nguyen et al. | 358/1.15 |
| 7,644,264 | B1 * | 1/2010 | Olsen | 713/2 |
| 7,743,390 | B2 * | 6/2010 | Cheng | 719/327 |
| 7,924,461 | B2 * | 4/2011 | Kim et al. | 358/2.1 |
| 8,014,025 | B2 * | 9/2011 | Steele et al. | 358/1.9 |
| 2003/0184784 | A1 * | 10/2003 | Ferlitsch | 358/1.13 |
| 2004/0098714 | A1 * | 5/2004 | Metz | 717/168 |
| 2004/0212829 | A1 * | 10/2004 | Uchida | 358/1.15 |
| 2006/0232810 | A1 | 10/2006 | Kishino | |
| 2007/0083679 | A1 | 4/2007 | Kikuchi | |
| 2008/0126138 | A1 * | 5/2008 | Cherney et al. | 705/4 |
| 2008/0175641 | A1 * | 7/2008 | Harris et al. | 400/62 |

FOREIGN PATENT DOCUMENTS

CN 1924839 A 3/2007
KR 2006-105482 10/2006

OTHER PUBLICATIONS

Curtis N. Vanderpuije, Innovation Color Management Methods for RGB Printing, 2006.*
Chinese Office Action dated Mar. 22, 2011, issued in Chinese Patent Application No. 200810137742.3.
Chinese Office Action dated Aug. 31, 2011 from Chinese Patent Application No. 200810137742.3.
Chinese Office Action dated Nov. 30, 2011 from Chinese Patent Application No. 200810137742.3.
Chinese Office Action dated Mar. 7, 2012, from Chinese Patent Application 200810137742.3.

* cited by examiner

*Primary Examiner* — Lechi Truong
(74) *Attorney, Agent, or Firm* — Staas & Halsey LLP

(57) ABSTRACT

A method of installing printer drivers of image forming apparatuses in an environment that employs a universal printer driver is provided. Accordingly, it is possible to provide an environment for using printer drivers of image forming apparatuses that is convenient to a user by deleting printer drivers of image forming apparatuses that were previously installed by using the universal printer driver and by installing printer drivers of image forming apparatuses corresponding to a predetermined standard.

9 Claims, 5 Drawing Sheets

FIG. 4

REQUEST FOR APPARATUS ATTRIBUTE...
SELECT PRINTER TO BE USED

PRINTER :
☐ RECENTLY USED PRINTER
  ☐ 10.88.195.24
☐ SEARCH FOR PRINTER
  ☐ INPUT ADDRESS OF PRINTER...
  ☐ SEARCH FOR NETWORK PRINTER...
    [Samsung CLP-300 (SEC0000F0A4BCAE)]
  ☐ SEARCH FOR SHARE OF PRINTING...

PRINTER INFORMATION :
Samsung CLP-300 (SEC0000F0A4BCAE)
MODEL : Samsung CLP-300
ADDRESS : 10.88.193.246

CONFIRM STATUS.... — 402

OPTION
☐ SETTING — 420
  ☐ PRINTER DRIVERS OF IMAGE FORMING APPARATUSES USED WITHIN A PREDETERMINED PERIOD — 424
  ☐ PRINTER DRIVERS OF IMAGE FORMING APPARATUSES USED MORE THAN A PREDETERMINED NUMBER OF TIMES — 426
  ☐ USER SELECTION — 428
☐ DELETE — 410
  ☐ DELETE ALL THE PRINTER DRIVERS OF IMAGE FORMING APPARATUSES PREVIOUSLY INSTALLED THROUGH UPD — 412
  ☐ USER SELECTION — 414

☐ ADD THIS PRINTER TO MY PRINTER AND FAX FOLDER

SET UP

400

METHOD AND APPARATUS FOR INSTALLING PRINTER DRIVERS OF IMAGE FORMING APPARATUSES IN PRINTING ENVIRONMENT EMPLOYING UNIVERSAL PRINTER DRIVER

CROSS-REFERENCE TO RELATED APPLICATION

This application claims the benefit of Korean Patent Application No. 2007-73504, filed on Jul. 23, 2007 in the Korean Intellectual Property Office, the disclosure of which is incorporated herein in its entirety by reference.

BACKGROUND OF THE INVENTION

1. Field of the Invention

Aspects of the present invention relate to a method and apparatus for installing printer drivers of image forming apparatuses in a printing environment that employs a universal printer driver.

2. Description of the Related Art

In general, when an image forming apparatus (such as a printer) prints a document prepared by a host device (such as a personal computer (PC)), the host device needs a printer driver for driving the image forming apparatus. The printer driver serves to transform data prepared by using an application program of the host device into data that is interpretable by the image forming apparatus. The host device performs bidirectional communication with the image forming apparatus through the printer driver. In general, since interpretable data vary according to the image forming apparatus, a printer driver corresponding to a model of an image forming apparatus to be used has to be installed in the host device. In order to reduce the inconvenience of installing a print driver corresponding to an image forming apparatus, a universal printer driver (UPD) has been introduced.

FIG. 1 illustrates the structure of a universal printer driver. As shown in FIG. 1, the universal printer driver includes a script file 110 including information on each model of image forming apparatus so as to support a driver core 100 and a plurality of image forming apparatus models. More specifically, the script file 110 includes model names of connected image forming apparatuses 120 to 160 for recognizing the image forming apparatuses 120 to 160, information on whether the type of each image forming apparatus is of a color type or mono type, information on whether the printing resolution is 1200 dpi or 600 dpi, information on the number of paper feeder boxes, information on whether the maximum size of print papers is A4 or A3, and the like. When using the universal printer driver, it is possible to support the plurality of image forming apparatuses 120 to 160 by using the information specified for each image forming apparatus model. At this time, the universal printer driver can operate in two modes: a general mode and a dynamic mode. In the general mode, the universal printer driver operates like a conventional printer driver. That is, the script file 110, including the printer driver core 100 and information specified for an image forming apparatus model selected by a user, is fixed. In contrast, in the dynamic mode, in order to bind the script file 110 including the printer driver core 100 and the information specified for an image forming apparatus model whenever the printer driver is used, it is required to designate an image forming apparatus that is to be used.

To address this inconvenience, an option for fixedly using the printer driver of the image forming apparatus has been proposed. When the fixed printer driver is limitlessly used, a plurality of printer drivers of image forming apparatuses is installed in the host device, like in the case of conventional printer drivers. In this case, however, the plurality of printer drivers occupy a large part of the memory of the host device.

SUMMARY OF THE INVENTION

Aspects of the present invention provide in a method of installing printer drivers of image forming apparatuses in an environment that employs a universal printer driver, wherein unnecessary printer drivers of image forming apparatuses that were previously installed by using the universal printer driver are deleted from a plurality of folders, and printer drivers of image forming apparatuses corresponding to a predetermined standard are installed.

Aspects of the present invention also provide a computer-readable recording medium having embodied thereon a computer program for a host device to execute the aforementioned method.

According to an aspect of the present invention, there is provided a method of installing printer drivers of image forming apparatuses in an environment that employs a universal printer driver, the method including: deleting previously installed ones of the printer drivers previously installed by using the universal printer driver; and selectively installing printer drivers of image forming apparatuses corresponding to a predetermined standard after the deleting of the printer drives.

According to another aspect of the present invention, there is provided a computer-readable recording medium having embodied thereon a computer program for a host device to execute the aforementioned method of installing printer drivers of image forming apparatuses in the environment that employs the universal printer driver.

According to another aspect of the present invention, there is provided an apparatus for installing printer drivers of image forming apparatuses in an environment that employs a universal printer driver, the apparatus including: a control unit to delete previously installed ones of the printer drivers previously installed by using the universal printer driver; a selection unit to select printer drivers of image forming apparatuses based on a predetermined standard; and an installation unit to selectively install the printer drivers of the image forming apparatuses selected by the selection unit after deletion of the printer drivers by the control unit.

In aspects of the method and apparatus for installing printer drivers of image forming apparatuses in an environment that employs a universal printer driver, it is possible to prevent or reduce the memory waste of the host device by deleting printer drivers previously installed by using the universal printer driver, and by installing printer drivers of image forming apparatuses corresponding to a predetermined standard.

According to another aspect of the present invention, a method of managing a universal printer driver that supports a plurality of image forming apparatuses, includes displaying a graphic user interface (GUI) used to manage the universal printer driver by setting a standard; and using the universal printer driver to manage one or more printer drivers, which respectively correspond to the plurality of image forming apparatuses, according to the standard set in the universal printer driver to delete or install the one or more printer drivers.

According to another aspect of the present invention a host device, includes a universal printer driver to support a plurality of image forming apparatuses; a display to display a graphic user interface (GUI) used to manage the universal printer driver by setting a standard; and one or more printer drivers that is manageable by the universal printer driver according to the standard set in the universal printer driver to delete or install the one or more printer drivers, and which respectively correspond to the plurality of image forming apparatuses.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent and more readily appreciated by describing in detail exemplary embodiments thereof with reference to the accompanying drawings in which:

FIG. 4 illustrates a user interface including a window for setting options for deleting and installing printer drivers according to an exemplary embodiment of the present invention.

DETAILED DESCRIPTION OF THE EMBODIMENTS

Figure 1:
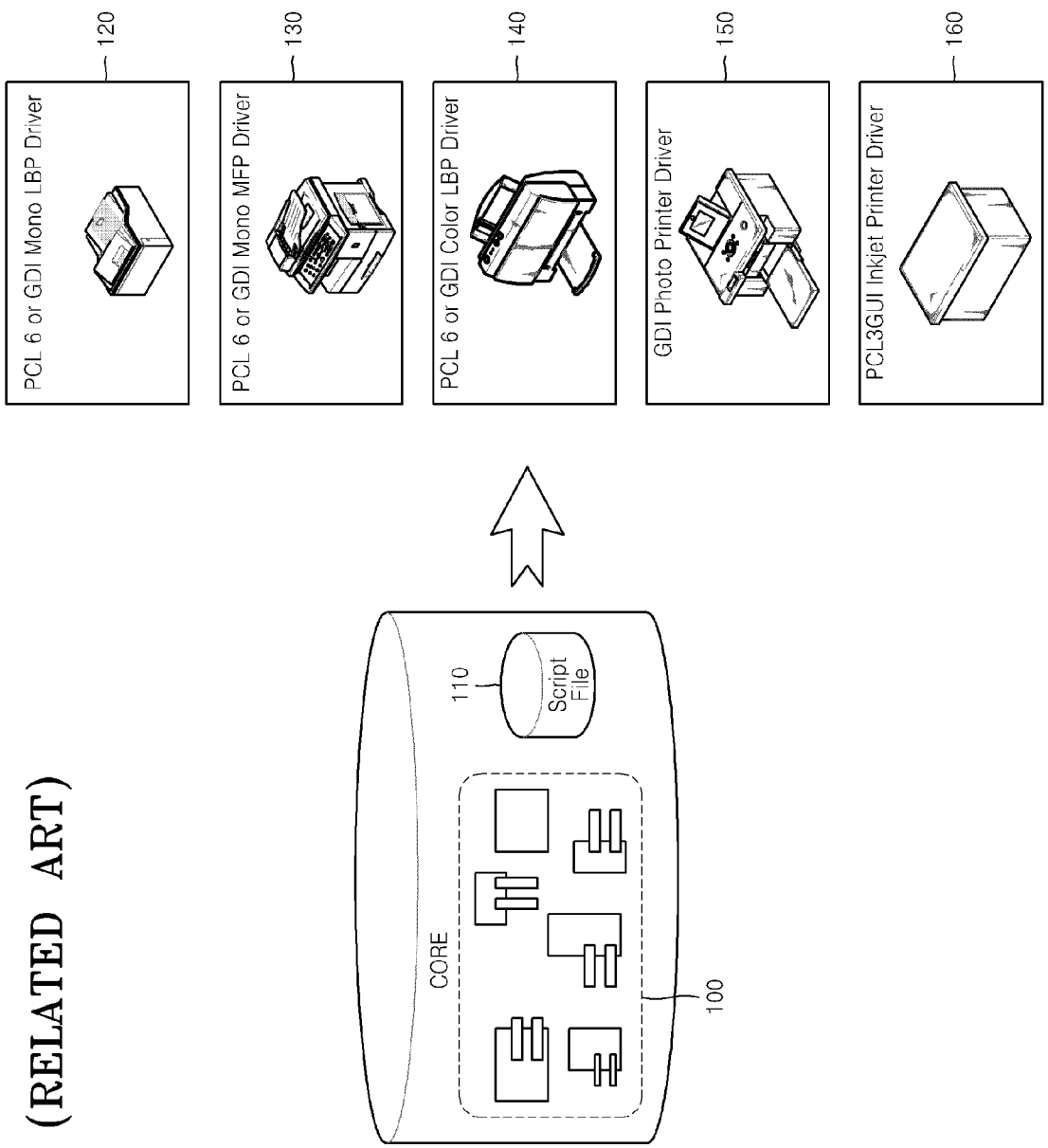
FIG. 1 illustrates a typical universal printer driver.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
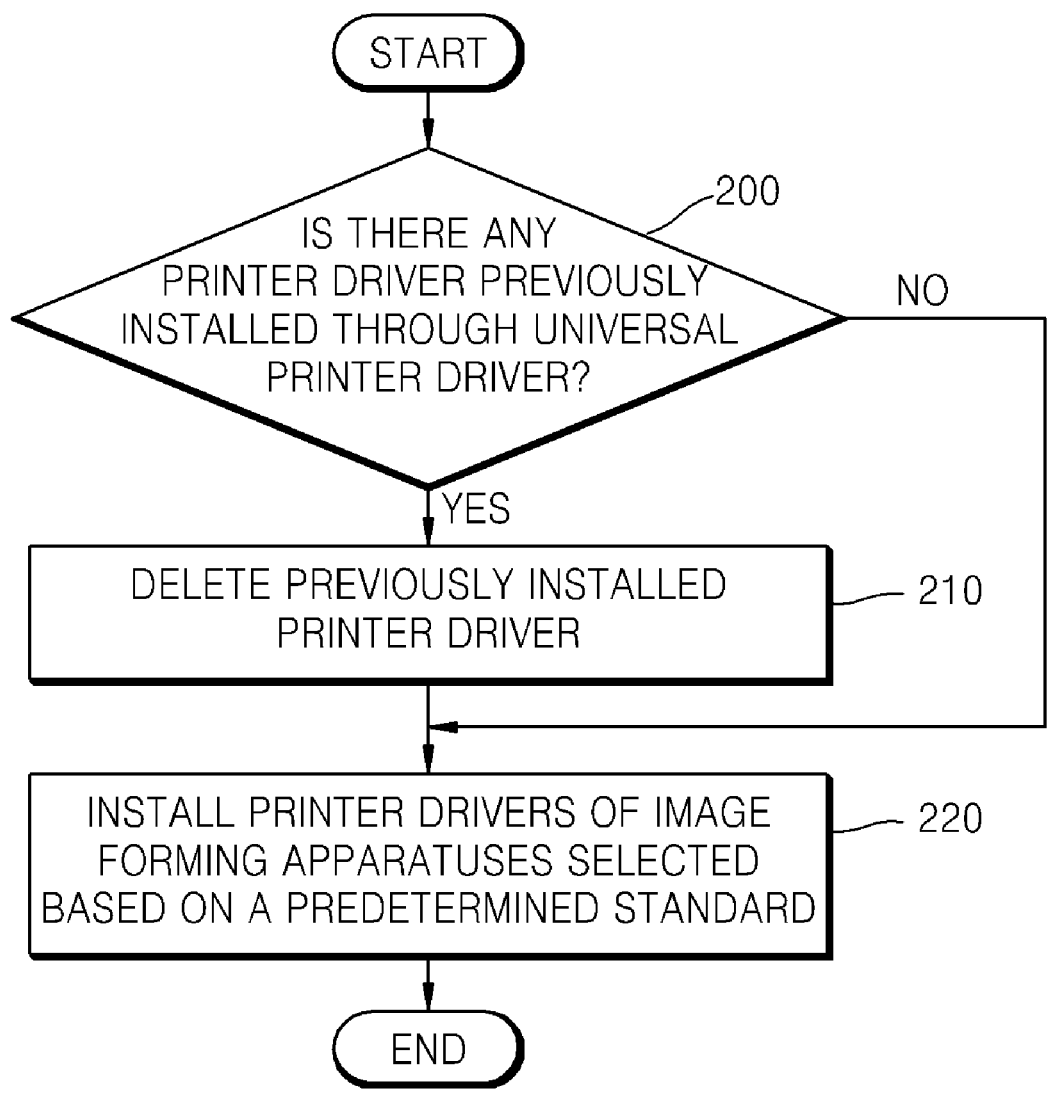
FIG. 2 is a flowchart of a method of installing printer drivers of image forming apparatuses in a printing environment that employs a universal printer driver according to an exemplary embodiment of the present invention.
Figure 3:
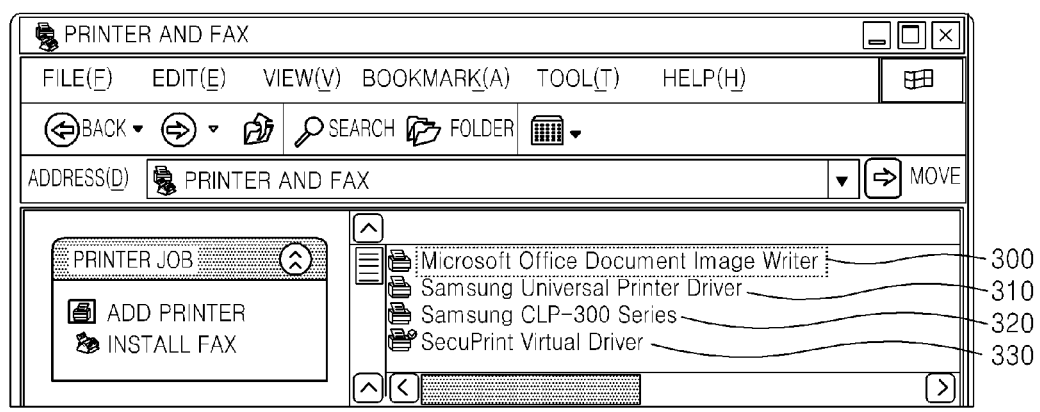
FIG. 3 illustrates a plurality of printer drivers displayed through a user interface.

FIG. 2 is a flowchart of a method of installing printer drivers of image forming apparatuses in a printing environment that employs a universal printer driver according to an exemplary embodiment of the present invention. In operation 200, it is checked whether there is any printer driver installed through the universal printer driver. When the universal printer driver is driven, a plurality of printer drivers may be installed through the driven universal printer driver. Accordingly, in operation 200, it is checked whether there is any printer driver previously installed in a host device through the universal printer driver. At this time, it is possible to know the location of any printer driver previously installed in the host device through a user interface. FIG. 3 illustrates a plurality of printer drivers displayed through a user interface. As shown in FIG. 3, when a plurality of printer drivers 300 to 330 is displayed through the user interface, it is possible to check whether the displayed printer drivers 300 to 330 have been previously installed in the host device. When it is determined that the printer drivers 300 and 330 have been previously installed through the user interface, operation 210 is performed. Alternatively, when it is determined that no printer driver has been previously installed through the user interface, operation 220 is performed.

In operation 210, the previously installed printer drivers are deleted. One or more printer drivers are deleted from among the plurality of print drivers of the image forming apparatuses previously installed in the host device. At this time, all the printer drivers of the image forming apparatuses previously installed in the host device may be deleted. Alternatively, only some of the printer drivers of the image forming apparatuses previously installed in the host device may be deleted.

FIG. 4 illustrates an interface 400 including a window for setting options for deleting and installing printer drivers as in operation 210 according to an exemplary embodiment of the present invention. The interface 400 of FIG. 4 serves to manage the universal printer driver and includes a window 402 for setting options for deleting and installing printer drivers. In the present embodiment, a deletion option 410 and an installation option 420 of the printer driver are displayed in a single window 402 through the interface 400 for managing the universal printer driver. However, the deletion and installation options 410 and 420 of the printer driver may be displayed through an interface separate from the interface 400 for managing the universal printer driver. In addition, in the present embodiment, the deletion and installation options 410 and 420 of the printer driver are embodied through the same interface 400. However, the present invention is not limited thereto, and the deletion and installation options 410 and 420 may be embodied through separate interfaces.

Hereinafter, referring to FIG. 4, a procedure performed in operation 210 of FIG. 2 will be described in more detail. Operation 210 of FIG. 2 is performed by setting the deletion option 410 in the option window 402 of the interface of FIG. 4. When all the printer drivers of the image forming apparatuses previously installed in the host device are to be deleted, all the printer drivers installed in the host device are deleted by setting an option 412 for deleting all the printer drivers in the deletion option 410 of FIG. 4. When only some of the printer drivers of the image forming apparatuses previously installed in the host device are to be deleted, only selected printer drivers are deleted by selecting printer drivers to be deleted, after setting a user selection option 414 in the deletion option 410 of FIG. 4.

Returning to FIG. 2, in operation 220, printer drivers of image forming apparatuses are selected based on a predetermined standard, and the selected printer drivers of the image forming apparatuses are installed. Here, printer drivers of image forming apparatuses used within a predetermined period (for example, printer drivers of recently used image forming apparatuses) or printer drivers of image forming apparatuses used more than a predetermined number of times (for example, printer drivers of frequently used image forming apparatuses) may be selected based on the predetermined standard. In addition, printer drivers of image forming apparatuses may be selected by a user. That is, operation 220 of FIG. 2 is performed by setting the installation option 420 in the option window of the user interface of FIG. 4. When options 424 to 428 for representing the predetermined standard are selected from the installation option 420, printer drivers of image forming apparatuses are installed in the host device based on the selected standard. When the installation of the printer drivers of the image forming apparatuses is completed, the driven universal printer driver terminates its operation.

Figure 5:
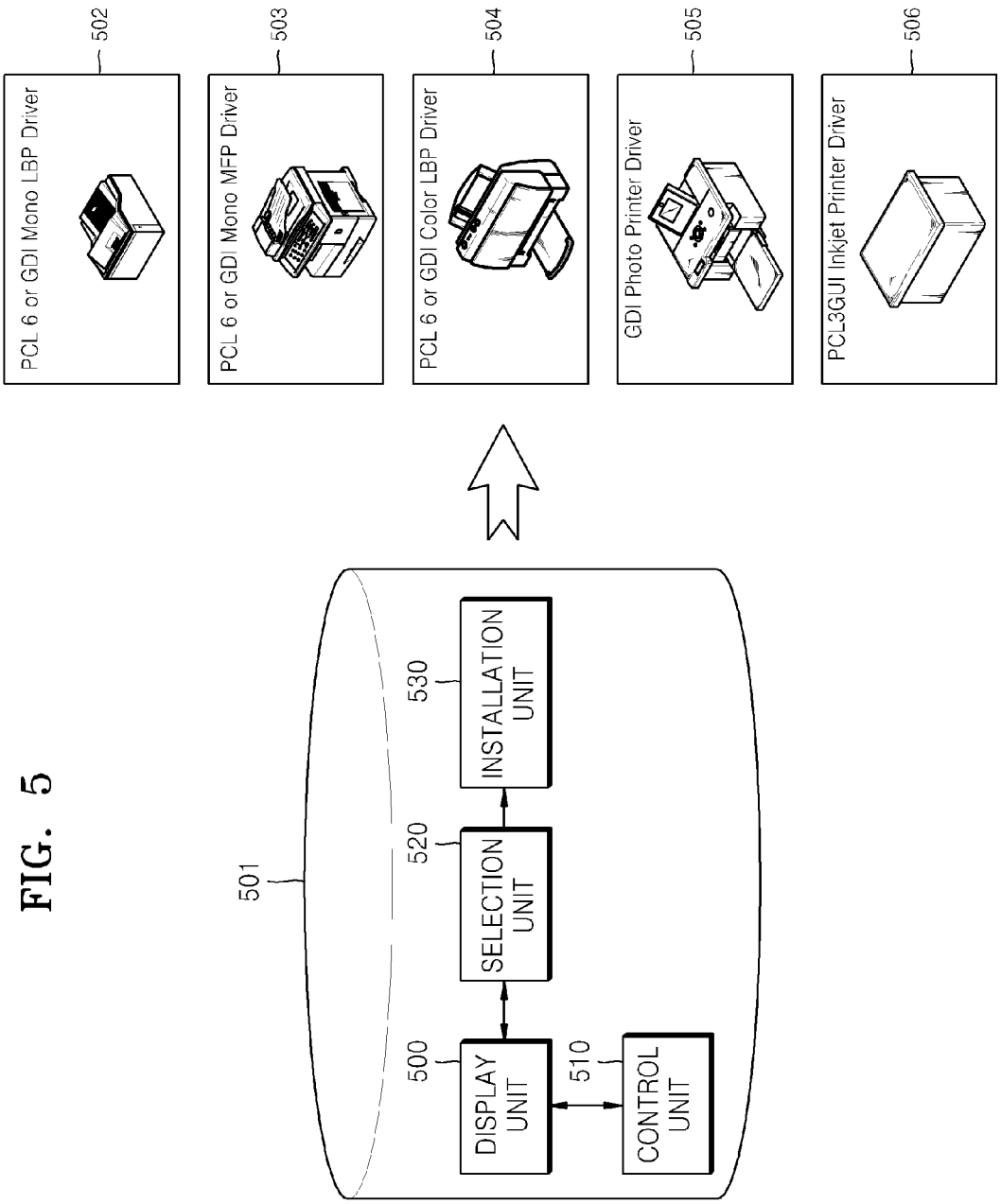
FIG. 5 is a block diagram illustrating an apparatus for installing printer drivers of image forming apparatuses in an environment that employs a universal printer driver according to an exemplary embodiment of the present invention.

FIG. 5 is a block diagram illustrating an apparatus for installing printer drivers of image forming apparatuses in an environment that employs a universal printer driver according to an exemplary embodiment of the present invention. An apparatus 501 for installing the printer driver of the image forming apparatus in the environment that employs the universal printer driver according to the present embodiment includes a display unit 500, a control unit 510, a selection unit 520, and an installation unit 530. The apparatus 501 for installing the printer driver of the image forming apparatus in the environment that employs the universal printer driver can install printer drivers of a plurality of image forming apparatuses 502 to 506 connected to the apparatus 501. While not required, the apparatus 501 can be included in a computer, a personal digital assistant, or any portable or non-portable device which prints through image forming devices.

The display unit 500 displays printer drivers of image forming apparatuses previously installed in the host device through a user interface. At this time, as shown in FIG. 3, the user interface displays a plurality of printer drivers installed in the host device through the universal printer driver. In addition, as shown in FIG. 4, the display unit 500 displays an interface used to set options for deleting and installing printer drivers. The display unit 500 can be connectable to the apparatus 501, or can be integrated to a housing of the apparatus 501 as in a portable computer.

The control unit 510 deletes one or more printer drivers of image forming apparatuses from among the printer drivers of the image forming apparatuses previously installed in the host device. At this time, the control unit 510 may delete all the printer drivers of the image forming apparatuses installed in the host device or some of the printer drivers of the image forming apparatuses installed in the host device. When the control unit 510 desires to delete all the printer drivers of the image forming apparatuses installed in the host device, the control unit 510 deletes all the printer drivers installed in the host device by setting the option 412 for deleting all the printer drivers in the deletion option 410 of the user interface of FIG. 4. In addition, when the control unit 510 desires to delete some of the printer drivers of the image forming apparatuses installed in the host device, the control unit 510 deletes only selected drivers by setting a user selection option 414 in the deletion option 410 of the user interface of FIG. 4 and selecting printer drivers to be deleted. When printer drivers of image forming apparatuses have been previously installed through the universal printer driver, the control unit 510 can set the deletion option 410. Alternatively, when there no printer driver has been previously installed through the universal printer driver, the control unit 510 does not operate.

The selection unit 520 can select standards of printer drivers of image forming apparatuses to be installed in the host device from the user interface displayed on the display unit 500. At this time, a standard for selecting printer drivers of image forming apparatuses may be set so that printer drivers of image forming apparatuses used within a predetermined period (for example, printer drivers of recently used image forming apparatuses) or printer drivers of image forming apparatuses used more than a predetermined number of times (for example, printer drivers of frequently used image forming apparatuses) may be selected by the selection unit 520. In addition, printer drivers of image forming apparatuses may be selected by a user. That is, the selection unit 520 can select the options 424 to 428 for representing a predetermined standard from the installation option 420 of the user interface of FIG. 4.

The installation unit 530 installs printer drivers of image forming apparatuses corresponding to the standard selected by the selection unit 520 in the host device.

In other aspects, the standard for selecting printer drivers of image forming apparatuses may be set so that printer drivers that may be selected by the selection unit 520 are of the image forming apparatuses that are compatible with the universal printer driver.

The embodiments of the present invention can be written as computer programs and can be implemented in general-use digital computers that execute the programs using a computer readable recording medium. In addition, data structures used for the embodiments of the present invention can be recorded in the computer readable recording medium through various ways. Examples of the computer readable recording medium include, but are not limited to, magnetic storage media (e.g., ROM, floppy disks, hard disks, etc.) and/or optical recording media (e.g., CD-ROMs, or DVDs).

While aspects of the present invention have been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims and equivalents thereof, and all differences within the scope will be construed as being included in the present invention.

What is claimed is:

1. A method of installing printer drivers of image forming apparatuses in an environment that employs a universal printer driver, the method comprising:

checking whether there is any printer driver previously installed;

deleting, by using the universal printer driver, printer drivers of one or more image forming apparatuses previously installed by using the universal printer driver and not performing the deleting operation when it is checked that no printer driver was previously installed; and selectively installing, by using the universal printer driver, printer drivers of one or more image forming apparatuses selected based on a predetermined standard after the deleting of the printer drivers, wherein the deleting operation comprises:

displaying the previously installed printer drivers of one or more image forming apparatuses;

selecting one or more printer drivers from among the displayed printer drivers; and deleting the selected one or more printer drivers of image forming apparatuses.

2. The method of claim 1, wherein the deleting operation comprises deleting all the previously installed printer drivers of image forming apparatuses.

3. The method of claim 1, wherein the deleting operation and the installing operation are performed by setting an option for representing each process in a user interface.

4. The method of claim 3, further comprising displaying the option in a separate window in the user interface.

5. The method of claim 1, wherein the one or more image forming apparatuses selected based on the predetermined standard are one or more image forming apparatuses used within a predetermined period, one or more image forming apparatuses used more than a predetermined number of times, one or more image forming apparatuses selected by a user, or combinations thereof.

6. A non-transitory computer-readable recording medium having embodied thereon a computer program for a host device to execute the method of claim 1.

7. An apparatus for installing printer drivers of image forming apparatuses in an environment that employs a universal printer driver, the apparatus comprising:

a processor;

a control unit to check whether there is any printer driver previously installed and to delete, using the processor, one or more printer drivers previously installed by using the universal printer driver, wherein the control unit does not delete when no printer driver was previously installed;

a selection unit to select image forming apparatuses based on a predetermined standard;

an installation unit to selectively install, by using the universal printer driver, the printer drivers of image forming apparatuses selected by the selection unit after deletion of the one or more printer drivers by the control unit; and a display unit to display the previously installed printer drivers of image forming apparatuses, wherein the control unit selects printer drivers to be deleted from among the printer drivers displayed on the display unit and deletes the selected printer drivers.

8. The apparatus of claim 7, wherein the control unit deletes all the previously installed printer drivers of image forming apparatuses.

9. The apparatus of claim 7, wherein the selection unit selects image forming apparatuses used within a predetermined period, image forming apparatuses used more than a predetermined number of times, image forming apparatuses selected by a user, or combinations thereof.

* * * * *

UNITED STATES PATENT AND TRADEMARK OFFICE
CERTIFICATE OF CORRECTION

| | | |
|---|---|---|
| PATENT NO. | : 8,214,848 B2 | Page 1 of 1 |
| APPLICATION NO. | : 12/142101 | |
| DATED | : July 3, 2012 | |
| INVENTOR(S) | : Don-seon Lee et al. | |

It is certified that error appears in the above-identified patent and that said Letters Patent is hereby corrected as shown below:

On the title page, under Inventors, item [75] delete "Soung-jin Cho" and insert -- Seung-jin Cho --, therefor.

Signed and Sealed this
Twentieth Day of November, 2012

David J. Kappos
*Director of the United States Patent and Trademark Office*